US010171929B2

(12) United States Patent
Killham et al.

(10) Patent No.: US 10,171,929 B2
(45) Date of Patent: Jan. 1, 2019

(54) POSITIONAL AUDIO ASSIGNMENT SYSTEM (71) Applicant: Lightbox Video Inc., Toronto (CA)

(72) Inventors: Josh Killham, Toronto (CA); Justin O'Heir, Toronto (CA)

(73) Assignee: Lightbox Video Inc., Toronto, ON ( * ) Notice: Subject to any disclaimer, the term of this patent is extended or adjusted under 35 U.S.C. 154(b) by 0 days.

(21) Appl. No.: 15/632,015

(22) Filed: Jun. 23, 2017

(65) Prior Publication Data

US 2017/0374486 A1 Dec. 28, 2017

Related U.S. Application Data (60) Provisional application No. 62/353,810, filed on Jun. 23, 2016.

(51) Int. Cl.
*H04R 5/02* (2006.01)
*H04S 7/00* (2006.01)
(Continued)

(52) U.S. Cl.
CPC .......... *H04S 7/303* (2013.01); *G02B 27/0093* (2013.01); *G02B 27/017* (2013.01);
(Continued)

(58) Field of Classification Search
CPC ......... H04N 21/21805; H04N 21/2187; H04N 21/41407; H04N 21/435; H04N 21/454; H04N 5/23238; H04N 21/439; H04N 21/44218; H04N 5/60; H04N 21/422; H04N 21/4223; H04N 21/44008; H04L 67/42; H04L 65/1083; H04L 65/403; H04R 2499/13; G10L 13/00; H04S 7/303; H04S 2400/01; H04S 2400/13; H04S 2420/07; H04S 7/307; H04S 7/308; H04S 2400/11
(Continued)

(56) References Cited

U.S. PATENT DOCUMENTS 7,391,887 B2    6/2008  Durnell
8,885,882 B1 *  11/2014 Yin .......................... G06F 3/00
                                                                  382/103

(Continued)

OTHER PUBLICATIONS

International Search Report and Written Opinion in International Application No. PCT/IB2014/053778, dated Sep. 28, 2017, 9 pages.

*Primary Examiner* — Lao Lun-See
(74) *Attorney, Agent, or Firm* — Fish & Richardson P.C.

(57) ABSTRACT

In some implementations, a positional audio assignment system is used to improve a user's immersion during content playback within a virtual reality setting. Data representing a video viewable to a user identifying spatial positions assigned to one or more objects within the video is initially obtained. Audio data encoding one or more audio streams corresponding to each of the one or more objects is also obtained. User input data associated with playback of the video is then received. A gaze point of the user based on the received user input data is then determined. The gaze point of the user is then evaluated with respect to the spatial positions assigned to the one or more objects. The audio output provided to the user is then selectively adjusted based on evaluating the gaze point with respect to the spatial positions assigned to the one or more objects.

19 Claims, 7 Drawing Sheets

(51) Int. Cl.
*H04N 13/279* (2018.01)
*G02B 27/00* (2006.01)
*G02B 27/01* (2006.01)
*G06F 3/01* (2006.01)

(52) U.S. Cl.
CPC .......... *G06F 3/012* (2013.01); *H04N 13/279* (2018.05); *H04R 5/02* (2013.01); *G02B 2027/014* (2013.01); *G02B 2027/0134* (2013.01); *G02B 2027/0138* (2013.01); *H04S 2400/11* (2013.01)

(58) Field of Classification Search
USPC ..... 381/77, 80, 81, 306, 310, 333, 104, 107, 381/119, 123, 307; 348/738, 78; 345/156, 158
See application file for complete search history.

(56) References Cited

U.S. PATENT DOCUMENTS

| | | | |
|---|---|---|---|
| 9,143,880 B2* | 9/2015 | Vennstrom | G06F 3/167 |
| 9,363,569 B1 | 6/2016 | Van Hoff et al. | |
| 9,451,210 B1* | 9/2016 | Smus | H04N 7/15 |
| 9,740,452 B2* | 8/2017 | Vennstrom | H04S 7/308 |
| 2014/0129354 A1 | 5/2014 | Soon-Shiong | |
| 2015/0293587 A1 | 10/2015 | Wilairat et al. | |
| 2015/0312561 A1* | 10/2015 | Hoof | G02B 27/0172 348/46 |
| 2017/0212583 A1* | 7/2017 | Krasadakis | G06F 3/013 |

* cited by examiner

FIG. 1

FIG. 2 CONTENT GENERATION

POSITIONAL AUDIO ASSIGNMENT SYSTEM

CROSS-REFERENCE TO RELATED APPLICATION

This application claims the benefit of U.S. Provisional Application No. 62/353,810, filed Jun. 23, 2016, and titled "Positional Audio Adjustment System," which is incorporated by reference.

FIELD

This specification generally relates to technology for displaying digital content.

BACKGROUND

Multimedia players enable users to view electronic content media such as video or audio produced by content providers. For example, mobile applications including multimedia players enable a client device to obtain digital content from content providers over a network connection and viewable to a user on the client device. Some multimedia players may include video and audio processing functionalities that improve the interactivity for users.

SUMMARY

Stereoscopic head-mounted devices such as virtual reality headsets are often used to provide users with an immersive experience that creates a perception that the user is surrounded by and/or physically present within an artificially generated environment. For instance, this perception is often created by providing the user with images, sound, or other stimuli that are associated with the artificially generated environment. An example of immersion technique is providing a three-dimensional image stimulation stretched across a wide field of view to give the user the impression that he/she is encapsulated by the video.

Head-mount devices can also include head motion tracking sensors (e.g., gyroscopes, accelerometers, structured light sensors, magnetometers, constellation arrays) for detecting head movements of a user relative to a field of view that is viewable to the user. The detected head movements can be used to enable user interactions within an immersion environment much like how touch input can be used to enable user interactions on a touchscreen interface. In this regard, head movement and/or eye movement tracking by head-mounted devices and the presentation of information to the user through a user's field of view can be used to improve and/or enhance immersion during content playback through the head-mounted device.

In some implementations, a positional audio assignment system can be used to selectively adjust audio output to improve a user's immersion during content playback within a virtual reality setting. For instance, adjusted audio output may include multiple audio streams that are each associated with objects that are included within the user's field of view of a video. The user's head and/or eye movements within the user's field of view can be measured in order to determine a gaze point that indicates a location where the user is presently directing his/her attention. The gaze point can then be evaluated with respect to predetermined spatial positions within the user's field of view that are assigned to each of the objects. The output of the individual audio streams can then be adjusted based on the evaluation of the user's gaze point in relation to the spatial positions.

As an example, a user may the positional audio assignment system to view a music video in a virtual setting. The music video includes multiple music artists that are assigned to a respective spatial location within the user's field of view during playback of the music video. A user's gaze point may be determined based on head or eye movements, and then evaluated against the spatial locations to determine whether the user is "looking at" a particular music artist. The audio output to the user can then be adjusted based on the evaluation.

The selective audio adjustment can be accomplished using a variety of techniques. In some implementations, the user's gaze point evaluation is used to selectively output an audio stream of the particular music artist that is determined to be the closest to the user's gaze point. In such implementations, the audio outputted to the user is dynamically adjusted based on the user's gaze within the field of view of the music video. In other implementations, the user's gaze point evaluation is used to adjust the volume of the audio stream associated with each music artist. In such implementations, the audio outputted to the user is generated using an aggregation technique to combine individual audio streams with different magnitudes of volume. The volumes can be adjusted using a scaling factor that is proportional to the distance between the user's gaze point and the spatial location associated with each music artist. In this regard, a user's real-time activities during content playback can be used to dynamically adjust audio output, increasing the immersive effect related to content playback.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

In general, a positional audio assignment system can be used to selectively adjust audio output to improve a user's immersion during content playback within a virtual reality setting. For instance, adjusted audio output may include multiple audio streams that are each associated with objects that are included within the user's field of view of a video. The user's head and/or eye movements within the user's field of view can be measured in order to determine a gaze point that indicates a location where the user is presently directing his/her attention. The gaze point can then be evaluated with respect to predetermined spatial positions within the user's field of view that are assigned to each of the objects. The output of the individual audio streams can then be adjusted based on the evaluation of the user's gaze point in relation to the spatial positions.

Figure 1:
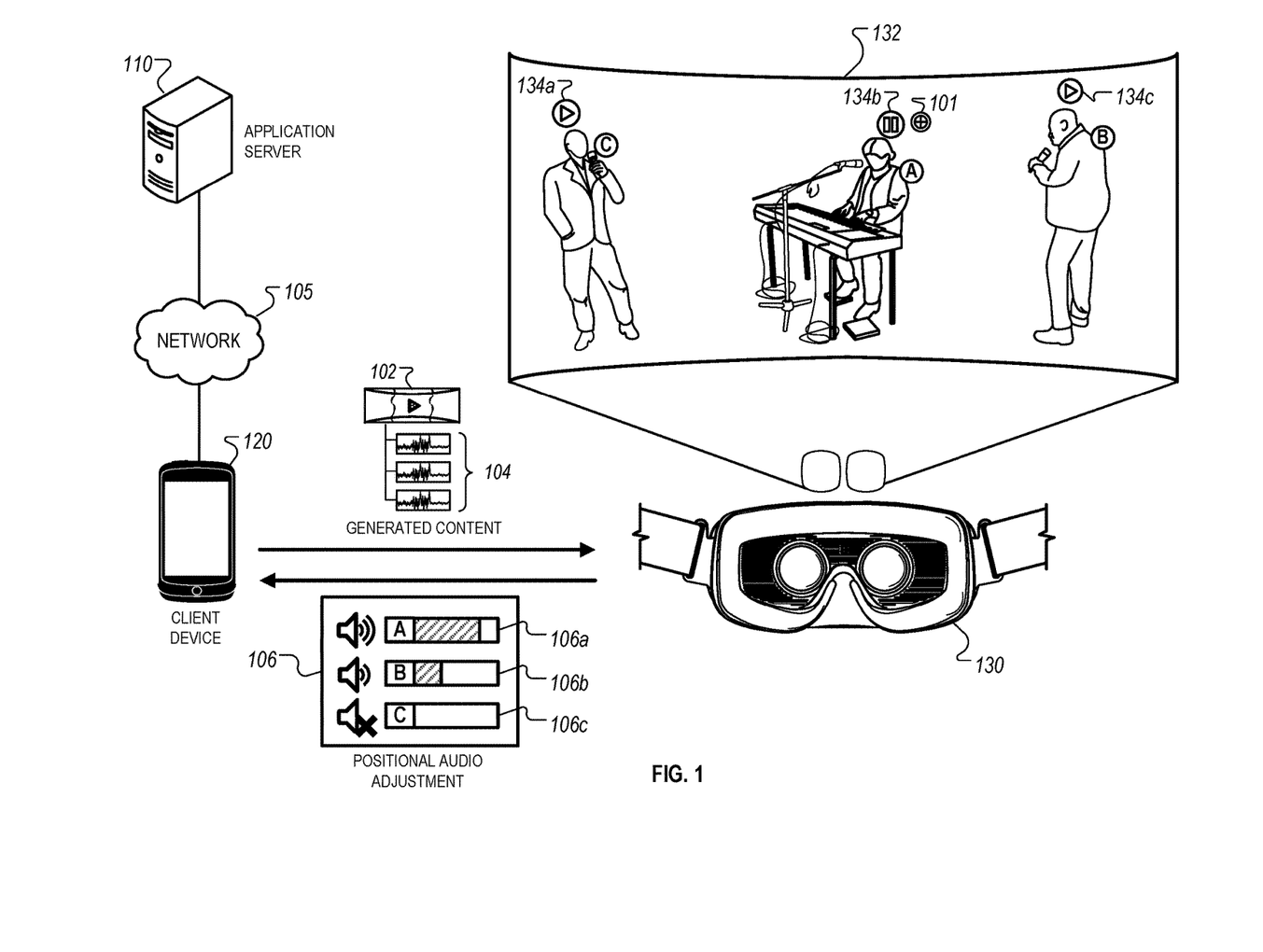
FIG. 1 illustrates an example of a positional assignment system.

FIG. 1 illustrates an example of a positional assignment system 100. The system includes an application server 110 and a client device 120, which exchange data communications over a network 105. The client device 120 also exchanges data with a headset 130 that provides an interface 132 viewable to a user 122 associated with the client device 120.

Briefly, the client device 120 initially obtains multimedia content 102 including a set of audio streams 104 over the network 105. The digital content 102 is then provided for output through the headset 130 as the interface 132. The user interface 132 enables the digital content 102 to be viewable to the user 122. The user interface 132 also includes spatial positions that are each assigned to objects 133a, 133b, and 133c. User Input such as head movement or eye tracking of the user 122 is then detected by the headset 130 during playback of the digital content 102 on the interface 132. The detected user input is then evaluated in relation to spatial positions within the interface 132 in order to determine position audio adjustment 106 associated with the output of each of the audio streams 104 for output to the user. The position audio adjustment 106 specifies volume levels 106a-106c for each of the audio streams 104 that are provided for output to the user 122.

In the example depicted in FIG. 1, the interface 132 provides a display of a music video that includes three music artists A, B, and C. Each of the artists are associated with audio streams A, B, C, respectively, within the list of audio streams 104. For example, each individual audio stream may include isolated audio data encoding sound produced specifically by the corresponding music artist. Each of the music artists A, B, and C are also associated with interface elements 134a, 134b, and 134c, respectively, which are placed on assigned spatial locations within the interface 132. The assigned spatial locations can correspond to central coordinates of each interface element within the interface 132.

A gaze point 101 of the user is then evaluated against the respective spatial locations assigned to the interface elements 134a-134c in order to adjust the audio provided to the user. The audio adjustment can either be a binary adjustment that either enables or disables output of a particular audio stream, or a magnitude adjustment that adjusts a volume of output of an individual audio stream based on a measured distance between the spatial position of the gaze point 101 and each of the assigned spatial positions of the interface elements 134a-134c. In the example, the positional audio adjustment 106 specifies a full volume 106a for the audio stream A because the spatial locations of the interface element 134a and the gaze point 101 are relatively close to one another. In contrast, the volume 106b for the audio stream B is reduced because the distance between spatial locations of the interface element 134b and the gaze point 101 are further apart. In the final example, the volume 106c is muted because the distance between the spatial locations of the interface element 134c and the gaze point 101 is greater than a predetermined threshold difference. As described in more detail below, other types of adjustments are also possible.

Referring now to the components of the system 100, the server 110 can be any type of remote server that is capable of transmitting multimedia content over to the client device 120 over the network 105. For instance, the server 110 transmits incoming and outgoing data transmissions from the client device 120. The server 110 also provides multimedia content 102 that is played back through the client device 120.

The server 110 can be managed and/or operated by a content provider that generates the multimedia content 102. For instance, the server 110 can be associated with a third party that generates the multimedia content 102 and enables access to the multimedia content 102 over the network 105. Examples of content providers can include application developers that provides access to a mobile application on the client device 130, or service providers that offer subscription-based services to users to access video or audio content over the network 105.

The client device 120 can be any type of electronic computing device that is capable of establishing communications with the server 110 over the network 105, and enabling playback of content obtained over the network 105 through the interface 132. For example, the client device 120 can be one or more of a smartphone, a tablet computing device, a notebook computing device, a desktop computing device, or any other type of applicable device.

The client device 120 can include multiple sensors (e.g., gyroscopes, accelerometers, structured light systems) that are capable of tracking user input data during playback of the multimedia content 102. For example, in some instances, the sensors of the client device 120 may track head and/or eye movements of the user 122 relative to the user's field of view on the interface 132. In addition, the client device 130 may execute one or more applications (e.g., mobile applications installed from an application store) that are configured to enable playback of the multimedia content 102 with the headset 130.

Figure 3A:
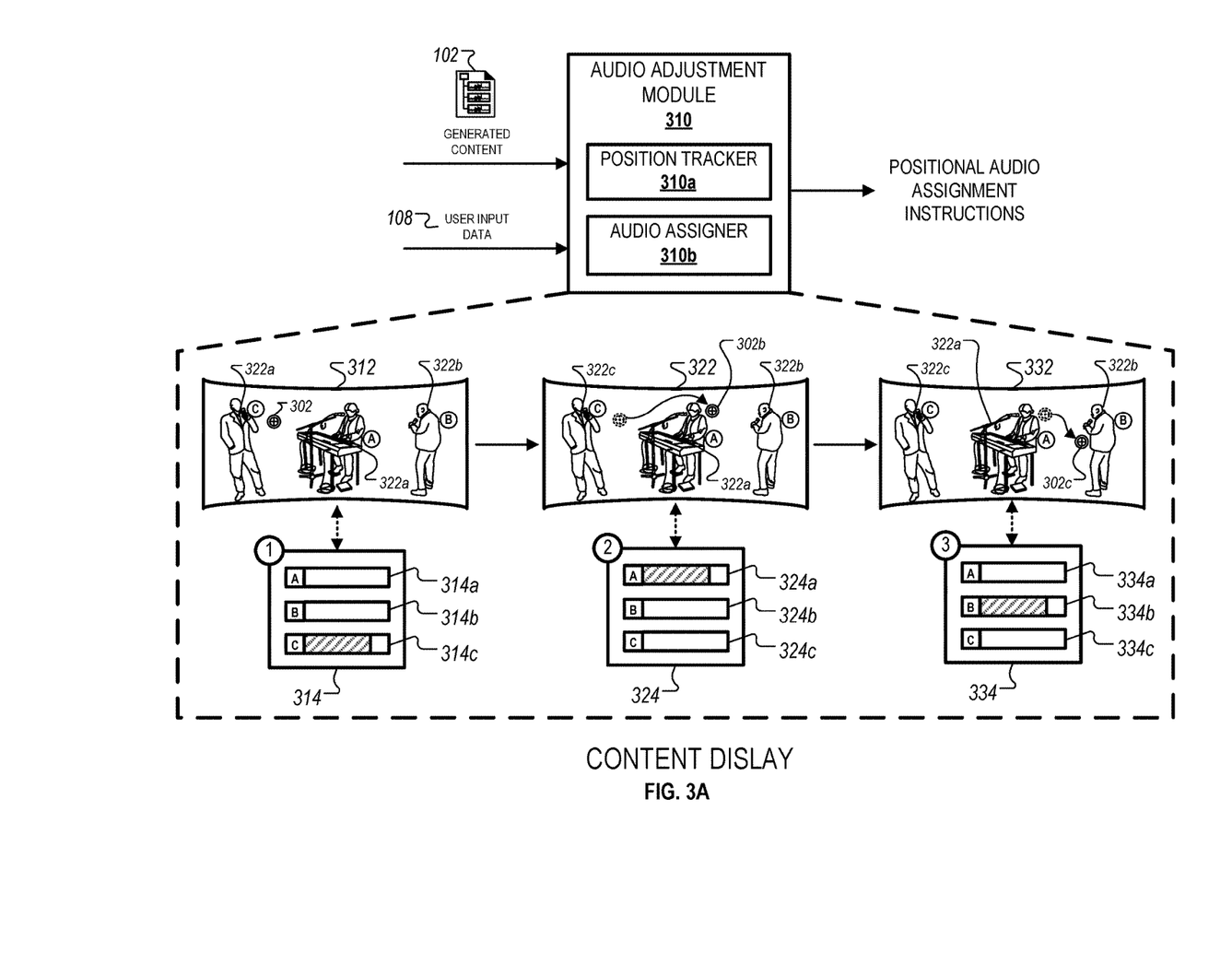
FIG. 3A illustrates a conceptual diagram for displaying multimedia content that includes positional assignment information.

The client device 120 can also include one or more software modules that process sensor data related to playback of the multimedia content 102. For example, the client device 130 includes an audio adjustment module as depicted in FIG. 3A to selectively adjust audio output to the user 122. More particular descriptions of the audio adjustment module are provided below with respect to FIG. 3A.

The headset 130 can be a head-mounted device that includes a set of optical lens for providing video output to each eye of the user 122. The headset 130 can exchange communications with the client device 120 in order provide the user interface 132 for display to the user 122.

In some implementations, the headset 130 is configured to operate in conjunction with a mobile device (e.g., the client device 120) such that the screen of the mobile device is used for the display shown through the optical lens of the headset 130. In such implementations, the sensors of the mobile device are used to collect head and/or eye tracking data of the user 122 during playback of the multimedia content 102 on the client device 120. As an example, the headset 130 can include a physical holder where the mobile device is placed in order to align the display of the mobile device with the optical lens of the headset 130 in order to provide the user interface 132.

Alternatively, in other implementations, the headset 130 includes a set of sensors separate from the client device 130 that are capable of collecting head and/or eye tracking data of the user 122 during playback of the multimedia content 102. As an example, the headset 130 can be configured to a desktop or notebook computing device through a wired connection for transmitting the multimedia content 102 for display through the optical lens on the interface 132 from the client device 120, and for transmitting collected user input data from the headset 130.

The headset 130 can also include various optional features. For example, the headset can include a focal adjustment feature to adjust the display of the interface 132 through the optical lens, or a physical interface (e.g., gamepads, remotes, touchpads, buttons, etc.) that enables the user 122 to interact with information and/or content provided for display on the interface 132.

Figure 2:
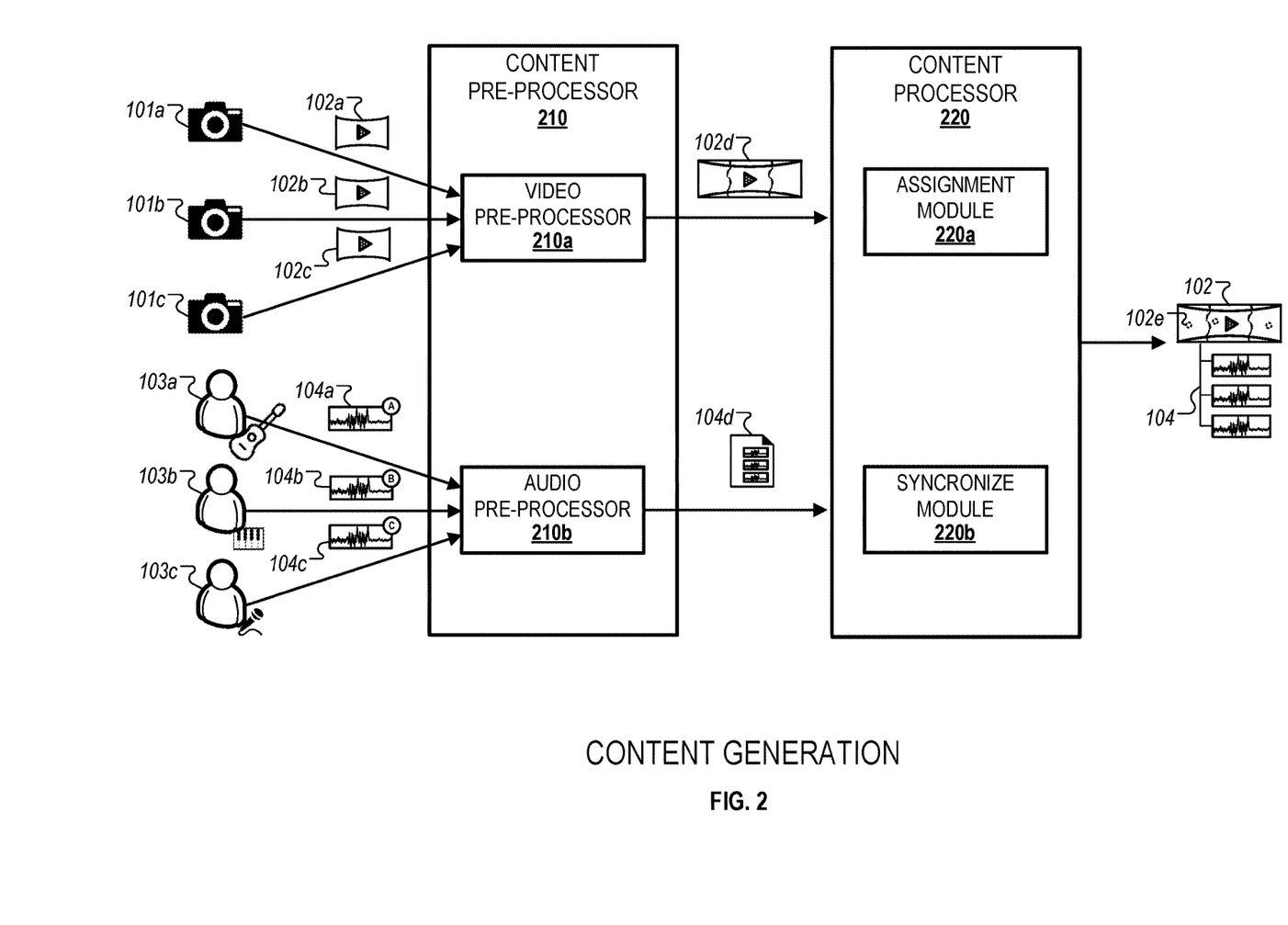
FIG. 2 illustrates a conceptual diagram for generating multimedia content that includes positional assignment information.

FIG. 2 illustrates a conceptual diagram for a system 200A for generating multimedia content including positional assignment information. The system 200A generally includes a content processor 210 and a content processor 220. The content processor 210 further includes a video processor 210a that obtains a set of video streams 102-c from video sources 101a-c, and an audio processor 210b that obtains a set of audio streams 104a-c from audio sources 103a-c. The content generator 220 further includes an assignment module 220a and a synchronization module 220b, which process a combined video stream 102d and a combined audio file 104d. The content processor 220 then generates and provides the digital content 102 for output. While FIG. 2 only illustrates three video sources and three audio sources for simplicity, in some implementations, a larger or greater number of audio and video sources can also be used.

In general, the system 200A can represent software components that are implemented on either the server 120, the client device 130, or a combination of both. For example, in instances where the multimedia content 102 is generated by a content provider, the system 200A can be a sub-component which provides the multimedia content 102 for access over the network 105 to the client device 120. Alternatively, the system 200A may instead be software that is executed on the client device 120 and allows the user 122 to provide user-generated content (e.g., captured videos or audio streams) to the system 200A in order to generate the content 102.

In more detail, the video processor 210a may initially receive multiple video streams 102-c from the video sources 101a-c, respectively. The video sources 101a-c can be any type of optically sensing element that is capable of capturing light and generating images or videos that represent the captured light. For example, the video sources 101a-c can be any type of electronic device that is capable of capturing video data.

During capture of the video streams 102-c, the video sources 101a-c are arranged such that each of the captured video streams 102-c represent adjoining fields of view of a particular video. For example, each of the video sources may be arranged in a circle such that the captured video streams 102-c each share regions within their respective fields of view, and combining the video streams 102-c by the video processor 210a results in the generation of a 360-degree video. For example, in one particular implementation, six video sources are arranged relative to one another using spherical-shaped object (e.g., four sources facing outward laterally, and two facing opposite directions perpendicular to the four sources). In such an implementation, the combination of the fields of views of each of the video sources can be used to construct a 360 degree video.

After receiving the video streams 102-c, the video processor 210a combines the respective fields of view of each video stream in order to generate a combined video 102d. The video processor 210a may stitch the respective fields of view by identifying overlapping regions between adjoining fields of view and then superimposing the overlapping regions to form a stitched video. In addition, the video processor 210a may also perform one or more video processing operations prior to or after the stitching procedure. For example, the video processor 210a may perform a synchronization process to ensure that each of the video streams 102-c are accurately aligned in time. In another example, the video processor 210a may perform one or more video processing techniques (e.g., contrast and color adjustments) to reduce any imaging artifacts present within the combined video stream 102d. The generated combined video stream 102d can then be provided to the content generator 220.

Referring now to the audio processor 210b, the audio processor 210b initially receives multiple audio streams 104a-c from the multiple audio sources 103a-c, respectively. The audio sources 103a-c can be any type of capture device that is capable of recording ambient sounds produced within a certain location. For example, the audio sources 103a-c may be microphones that capture audio data encoding sounds produced by different musical instruments or vocals of music artists.

During audio capture, the audio sources 103a-c are arranged such that each of the captured audio streams 104a-c encode sound produced specifically by the corresponding audio source. For example, the audio sources 103a-c can be arranged to sufficiently isolate sound generated from the other audio sources from being captured in each of the respective audio streams. In this regard, each of the audio streams 104a represent different sound segments that are isolated from a collection of sounds within a particular location (e.g., sound produced by each band member during the same recording session within a studio).

After receiving the audio streams 104a-c, the audio processor 210b combines the respective audio data encoded within each audio stream and generates a combined audio file 104d. In some instances, the different audio streams can be combined into a packetized multiplex audio file that includes different channels corresponding to each audio stream. In such instances, the packet information may include metadata associated with the corresponding audio source (e.g., name, artist, song, etc.). In addition, the audio processor 210b may also perform one or more audio processing operations prior to or after combination procedure. For example, the audio processor 210b may equalize each of the audio streams 104a-c in order to ensure that the sound quality is consistent across the different audio streams. In another example, the audio processor may adjust the sound balance of encoded data (e.g., bass, treble, etc.) in order to ensure that the sound encoded in each of the audio streams does not include audibly recognizable differences between individual audio streams. The generated combined audio file 104d can then be provided to the content generator 220.

Referring now to the content generator 220, the content generator 220 obtains the combined video 102d and the combined audio 104d and then generates the multimedia content 102. Referring the example described herein, during a music musical band recording session, the video streams 102-c can represent different adjoining fields of view of the musicians of the band, whereas the audio streams 104a-c can represent sounds produced by individual musicians within the band.

The assignment module 220a initially uses a set of image processing techniques to identify spatial locations within the combined video 102*d* that are associated with the audio sources 103*a-c* (e.g., locations of each musician within a 360 field video). The assignment module 220*a* then tags each of the identified spatial locations and generates a mapping that specifies metadata associated with each audio source and the coordinates within the combined video 102*d* associated with the corresponding spatial positions. The metadata from the audio sources 103*a-c* is then used to assign the appropriate audio stream to a spatial position associated a particular audio source. After completing this process, a generated mapping 124 then specifies information that relates (i) metadata associated with an audio source, (ii) spatial positions within the combined video 102*d* corresponding to the display of the audio source, and (iii) audio streams corresponding to the audio source.

Referring now to the synchronization module 220*b*, the synchronization module 220*b* performs a set of post-processing operations to ensure that timings associated events that take place within the combined video stream 102*d* are synchronized with events that take place within the combined audio 104*d*. For example, if sound produced by the different audio sources is staggered (e.g., a drummer entering into a song after a guitar solo), then the synchronization module 220*b* ensures that the video timestamp associated with the presentation of the staggered audio source within the combined video 102*d* is aligned with the audio stamp within the corresponding audio stream within the combined audio file 104*d*. Once the synchronization operation has been completed for each audio stream, the synchronization module 220*b* then combines the combined video 102*d* and the combined audio file 104*d* into a single file, and provides the generated content 102 for output. The content generator 220 then outputs the multimedia content 102 (e.g., as a video file with multiple audio channels) and the mapping table 224 (e.g., as metadata file).

In some implementations, prior to generating the multimedia content 102 and the mapping table 224, the content generator may add a set of embedded overlays onto the combined video 102*d*. The embedded overlays can represent viewable user interface elements during playback of the multimedia content 102. In some implementations, as depicted in FIG. 1, the user interface elements are placed at the spatial locations assigned to the audio sources (or target objects), and used to provide a user with a visual instruction on where to direct their gaze within the video to play the corresponding audio stream for the audio source associated with the interface element.

FIG. 3A illustrates a conceptual diagram of a system 300A for displaying multimedia content including positional assignment information. The system 300A generally includes an audio adjustment module 310 that receives digital content 102 and user input data 108 and generates positional audio assignment instructions. The audio adjustment module 310 further includes a position tracker 310*a* and an audio assigner 310*b*. The positional audio assignment instructions can then be used to selectively adjust audio output to a user based on the received user input data 108 during playback of multimedia content 102.

In general, the audio assignment module 310 may be software that is executed on the server 110, the client device 120, the headset 130, or a combination of two or more of these devices. For example, the audio assignment module 310 may be executed within a mobile application that operates on the client device 120 and provides the interface 132 for display to the user 122.

As depicted in the examples shown in FIG. 3A, user interfaces 312, 322, and 332 represent different instances of the interface 132 based on the head and/or eye movement of the user 122 during playback of multimedia content 102. At each instance, the position tracker 310*a* initially determines a gaze point 302 associated with the user 122, and then evaluates the gaze point 302 in relation to spatial positions associated with the target objects 322, 322*b*, and 322*c*. The gaze point evaluation is then used by the audio assigner 310*b* to generate a set of positional audio assignment instructions 314, 324, and 334 for each instance. In this regard, the audio adjustment module 310 tracks the gaze of the user 122 and processes corresponding real-time audio adjustments based on the gaze of the user.

The user interface 312 is initially made viewable to the user through the headset 130. In this instance, the position tracker 310*a* determines that the gaze point 302*a* corresponding to the determined gaze point 302*a* of the user 122 is within a vicinity of the spatial location assigned to the target object 322. In response to this determination, the audio assigner 310*b* then generates instructions 314 that assign the output of audio stream 314*a* corresponding to the target object 322. As shown, the instructions 314 specify only output of the audio stream 314*a* based on the close proximity of the gaze point 302*a* and the spatial position assigned to the target object 322.

The user interface 322 refers to a second instance where the user's detected gaze has changed based on head and/or eye movements detected by the position tracker 310*a*. In the example, the gaze point 302*b* is moved down and right along the indicated trajectory. In response to the change in the gaze point 302*b*, the position tracker 310*a* then re-evaluates the updated gaze point 302*b* relative to the spatial positions of the target objects 322*a*, 322*b*, and 322*c*. In the example, because the re-evaluation indicates that the updated gaze point is now within a close proximity to the spatial location assigned to the target object 322*c*, the instruction 324 indicate output of the audio stream 324*c* corresponding to the target object 322*c*.

The user interface 332 refers to a third instance where the user's detected gaze has changed once again. Like the prior instance, the position tracker 310*a* re-evaluates the gaze point 302*c* of the user 122, which is then used by the audio assigner 310*b* to provide output of the instruction 334. In the example, the gaze re-evaluation indicates that the updated gaze point 302*c* is within a close proximity to the spatial location assigned to the target object 322*b*. In response, the instruction 334 specifies output of the audio stream 334*b* corresponding to the target object 322*b*.

Figure 3B:
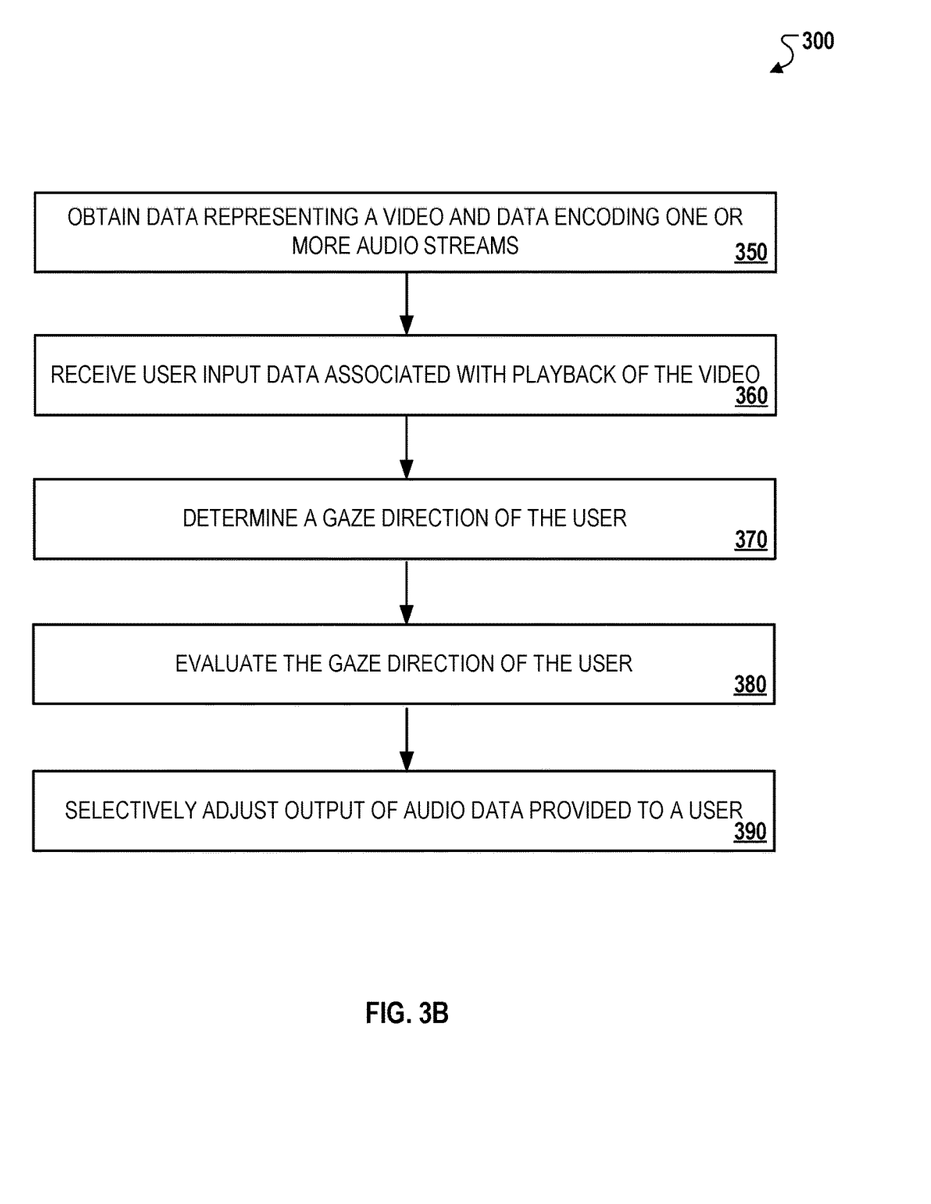
FIG. 3B illustrates an example of a process for displaying multimedia content that includes positional assignment information.

FIG. 3B illustrates an example of a process 300B for displaying multimedia content that includes positional assignment information. Briefly, the process 300B can include obtaining data representing a video and data encoding one or more audio streams (350), receiving user input data associated with playback of the video (360), determining a gaze point of the user (370), evaluating the gaze point of the user (380), and selectively adjusting output of audio data provided to a user (390).

In more detail, the process 300B can include obtaining data representing a video and data encoding one or more audio streams (350). For instance, the client device 120 may obtain data representing a video viewable to the user 122 through the headset 130. The video identifies spatial positions assigned to one or more objects within the video. In the example depicted in FIG. 1, the objects can be musicians of a band within a music video. The client device 120 may also obtain audio data encoding one or more audio streams corresponding to each of the one or more objects.

The process 300B can include receiving user input data associated with playback of the video (360). For instance, the client device 120 or the headset 130 may receive head and/or eye tracking data for the user 122. The data may be collected by sensors associated with either the client device 120 or the headset 130 (e.g., gyroscopes, accelerometers, etc.).

The process 300B can include determining a gaze point of the user (370). For instance, the position tracker 310a may determine a gaze point of the user 122 based on the received user input data. As described previously with respect to FIGS. 1 and 3A, the gaze point indicates an area on the interface 132 that represents the visual focus of the user 102. The determined gaze point is provided for display as a gaze point to the user 122.

The process 300B can include evaluating the gaze point of the user (380). For instance, the position tracker 310a may compare the spatial location within the interface 132 associated with the gaze point and spatial locations that are assigned to the objects within the video. Examples of evaluation techniques can include computing a distance between the spatial locations, determining an amount of time the gaze point is within a vicinity of the spatial location assigned to particular target object, or tracking trajectories indicating changes to the determined gaze point.

The process 300B can include selectively adjusting output of audio data provided to a user (390). For instance, the audio assigner 310b may selectively adjust audio output to the user 122 based on the evaluation of the user's gaze point. In some implementations, the selective adjustment can include selecting a particular audio stream from among multiple audio streams included within the multimedia content 102 to provide for output. In other implementations, the selective adjustment can include changes to the volume of particular audio streams based on the distance between the spatial position of the gaze point and the respective spatial positions assigned to each of the objects. For example, outputted audio can include different magnitudes of sound for each of the individual audio streams, which can then be adjusted in real-time based on changes to the user's gaze point relative to the spatial positions assigned to each of the objects. Adjustments to volume can be both positive and negative. For example, the audio assigner 310b can decrease the volumes associated with other audio streams whose assigned spatial positions are not within the visual focus of the user 122, while maintaining the volume associated with the audio stream whose spatial position is within the user's visual focus. Alternatively, the audio assigner 310b can only increase the volume associated with the audio stream whose assigned spatial position is within the visual focus, while maintaining the volumes associated with the other audio streams whose assigned spatial positions are not within the user's visual focus.

Figure 4A:
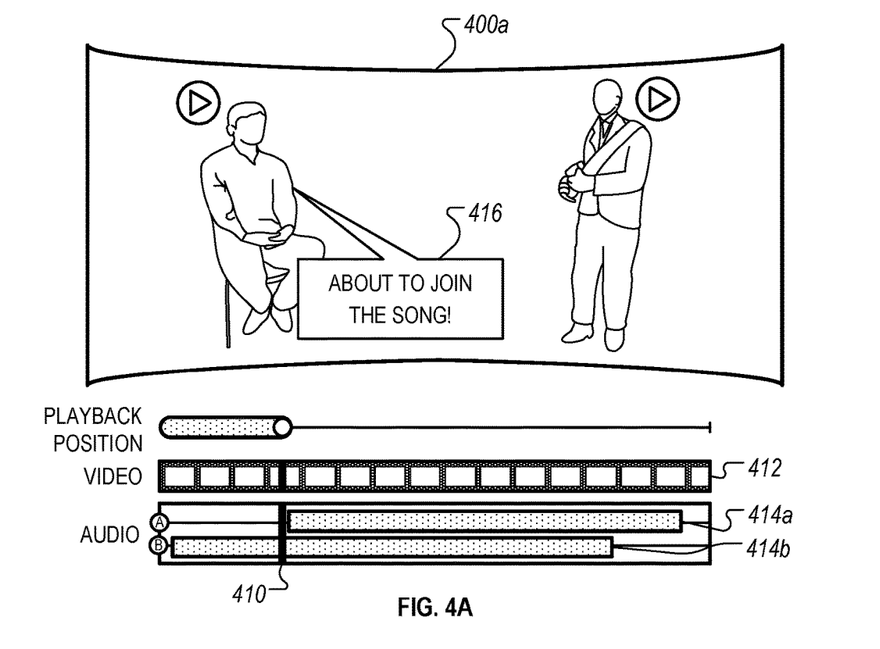
FIGS. 4A-4D illustrate examples of various interfaces that can be provided for output by the positional assignment system.
Figure 4B:
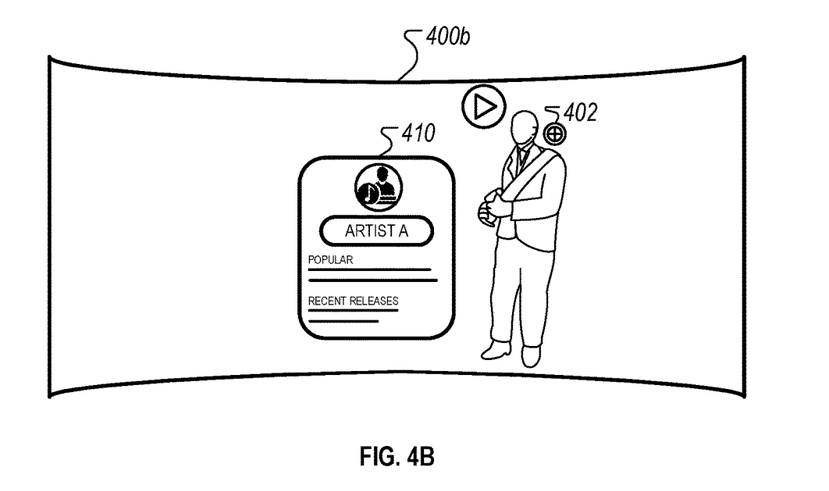
Figure 4C:
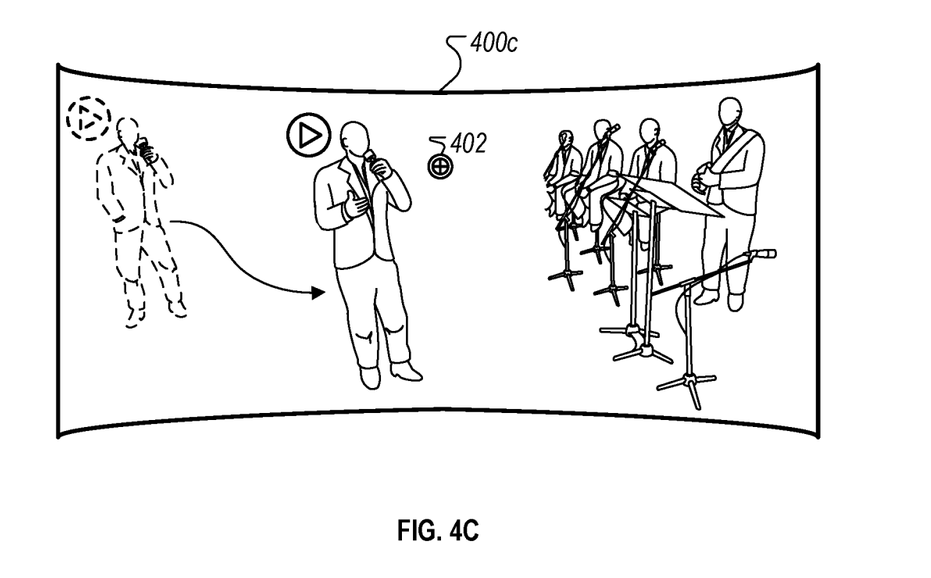
Figure 4D:
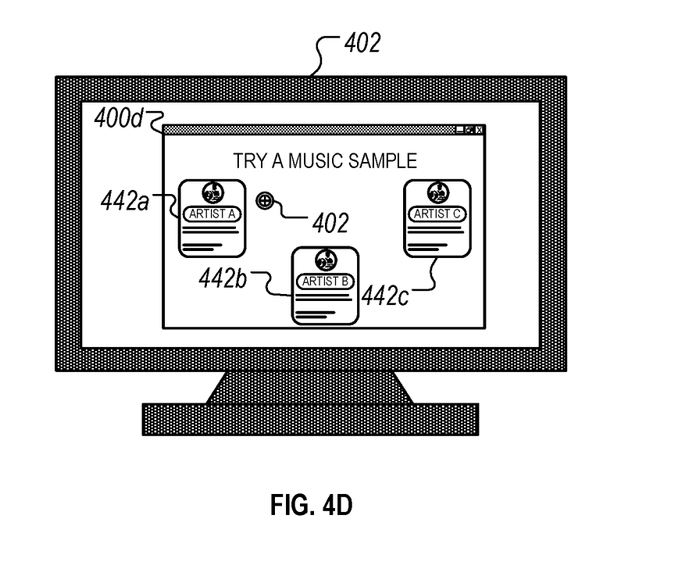

FIGS. 4A-4D illustrate examples of various interfaces that can be provided for output by the positional assignment system. FIG. 4A illustrates an example of a user interface 400a that provides positional notifications related to audio streams. FIG. 4B illustrates an example of a user interface 400b that displays metadata related to displayed objects that are viewable within a video. FIG. 4C illustrates an example of a user interface 400c that enables real-time tracking of objects that are viewable within a video. FIG. 4D illustrates an example of a user interface 400d that is viewable on a traditional display.

Referring initially to FIG. 4A, the interface 400a represents an example of an implementation in which notifications can be provided to users based on staggered audio streams within the duration of the multimedia content 102. In the example depicted, the multimedia content 102 includes a video stream 412 and audio streams 414a and 414b. The audio streams 414a and 414b are staggered throughout the duration of the playback of the video such that the sound encoded by the audio stream 414a is provided at a later time period than the sound encoded by the audio stream 414b. This can represent, for instance, a later entrance of an individual musician within a band performance. At the playback position 410, prior to the start position of the audio stream 414a, the interface 400A can provide a preemptive notification 416 to the user indicating that the musician is about to begin performing. In this regard, the example illustrated in FIG. 4A illustrates the capability of the system 100 to increase user interactivity based on the relationship between individual audio streams.

Referring now to FIG. 4B, the interface 400b represents an example of an implementation in which metadata associated with musicians within a music video can be provided for display based on the gaze point of the user 122. For example, in response to determining that the gaze point 402 is within the vicinity of the spatial position assigned to a particular musician, the interface 400b can dynamically provide a display notification 410 that includes metadata associated with the musician. The display notification 410 may be provided based on a variety of user input data. As an example, the notification 410 can be presented after the gaze point 402 is determined to be within a particular vicinity of the spatial position of the musician for a threshold period of time (e.g., one seconds). In another example, the notification 410 can be intelligently presented based on analyzing the movement of the gaze point 402 throughout the interface 400b (e.g., data indicating that the user continues to direct his/her visual focus towards a particular musician).

Referring now to FIG. 4C, the interface 400c represents an example of an implementation in which spatial positions can be dynamically assigned to objects such that the assigned spatial positions follow movement trajectories of the objects within a video. For example, if a musician changes locations within the video, then the spatial assignment can be dynamically adjusted to follow the change in location. In this regard, the audio output can be dynamically adjusted based on evaluations of the user's gaze relative to changes in the dynamically assigned spatial positions of objects within the video.

Referring now to FIG. 4D, the interface 400d represents an example of an implementation in which the techniques described throughout this specification can be applied to standard display screens. For example, instead of providing the user interface through the headset 130, the interface 400d is provided on the display device 402. The interface 400d can include various interface elements 442, 442b, and 442c that each correspond to a particular music artist. In this example, the interface 400d can be an application that is configured to run on either a mobile device or a desktop computing device. The gaze point of the user can then be determined based on using a camera that records a video of the user while using the display device 402.

Figure 5:
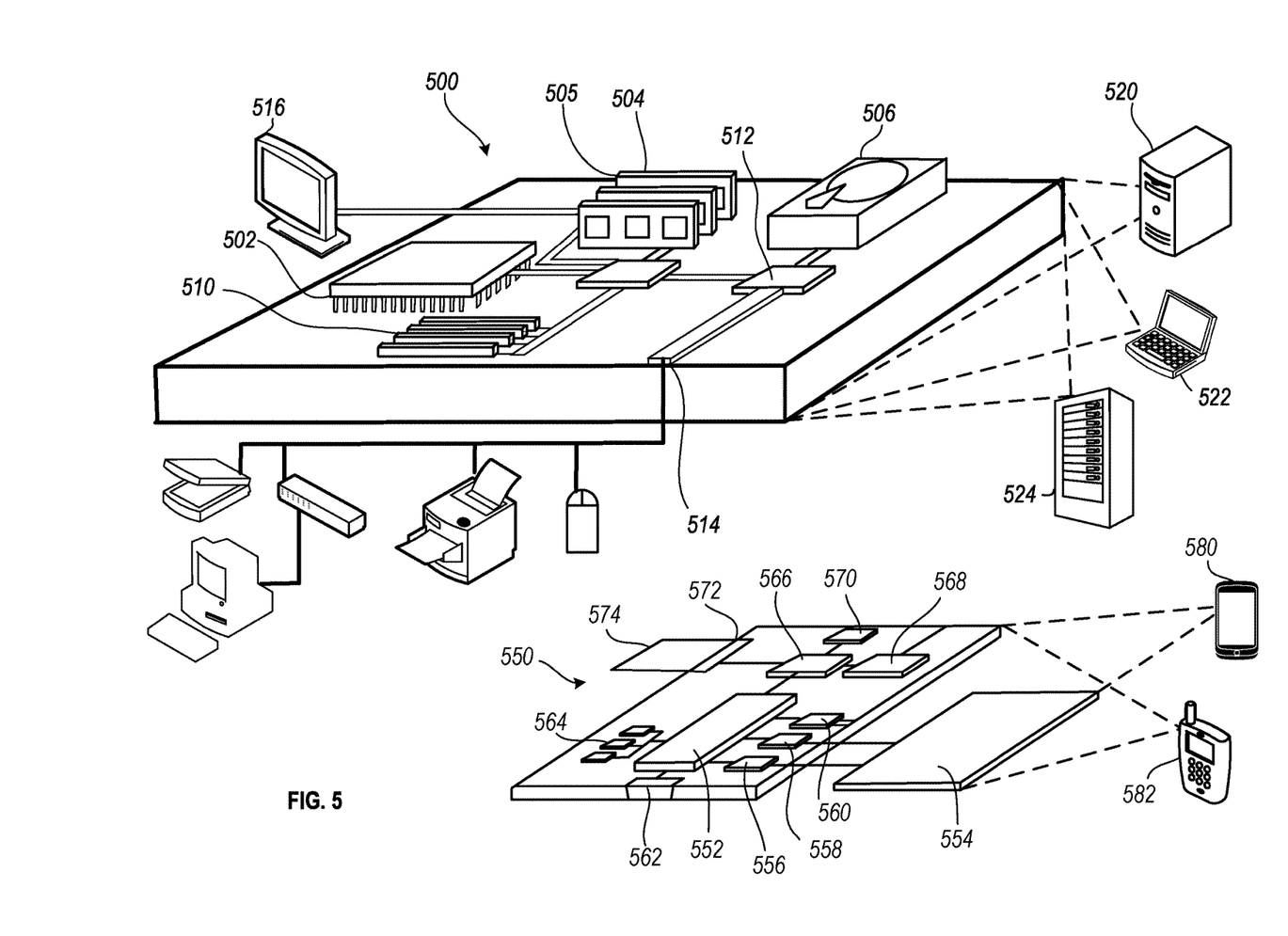
FIG. 5 is a block diagram of computing devices on which the processes described herein, or portions thereof, can be implemented.

FIG. 5 is a block diagram of computing devices 500, 550 that can be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally, computing device 500 or 550 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses can be used, as appropriate, along with multiple memories and types of memory. Also, multiple computing devices 500 can be connected, with each device providing portions of the necessary operations, e.g., as a server bank, a group of blade servers, or a multi-processor system.

The memory 504 stores information within the computing device 500. In one implementation, the memory 504 is a volatile memory unit or units. In another implementation, the memory 504 is a non-volatile memory unit or units. The memory 504 can also be another form of computer-readable medium, such as a magnetic or optical disk.

The storage device 506 is capable of providing mass storage for the computing device 500. In one implementation, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth intensive operations. Such allocation of functions is exemplary only. In one implementation, the high-speed controller 508 is coupled to memory 504, display 516, e.g., through a graphics processor or accelerator, and to high-speed expansion ports 510, which can accept various expansion cards (not shown). In the implementation, low-speed controller 512 is coupled to storage device 506 and low-speed expansion port 514. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

Computing device 550 includes a processor 552, memory 564, and an input/output device such as a display 554, a communication interface 666, and a transceiver 568, among other components. The device 550 can also be provided with a storage device, such as a microdrive or other device, to provide additional storage. Each of the components 550, 552, 564, 554, 566, and 568, are interconnected using various buses, and several of the components can be mounted on a common motherboard or in other manners as appropriate.

The processor 552 can execute instructions within the computing device 550, including instructions stored in the memory 564. The processor can be implemented as a chipset of chips that include separate and multiple analog and digital processors. Additionally, the processor can be implemented using any of a number of architectures. For example, the processor 510 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 550, such as control of user interfaces, applications run by device 550, and wireless communication by device 550.

Processor 552 can communicate with a user through control interface 458 and display interface 456 coupled to a display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can be provide in communication with processor 552, so as to enable near area communication of device 550 with other devices. External interface 562 can provide, for example, for wired communication in some implementations, or for wireless communication in other implementations, and multiple interfaces can also be used.

The memory 564 stores information within the computing device 550. The memory 564 can be implemented as one or more of a computer-readable medium or media, a volatile memory unit or units, or a non-volatile memory unit or units. Expansion memory 574 can also be provided and connected to device 550 through expansion interface 572, which can include, for example, a SIMM (Single In Line Memory Module) card interface. Such expansion memory 574 can provide extra storage space for device 550, or can also store applications or other information for device 550. Specifically, expansion memory 574 can include instructions to carry out or supplement the processes described above, and can include secure information also. Thus, for example, expansion memory 574 can be provide as a security module for device 550, and can be programmed with instructions that permit secure use of device 550. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that can be received, for example, over transceiver 568 or external interface 562.

Device 550 can communicate wirelessly through communication interface 566, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, WiFi, or other such transceiver (not shown). In addition, GPS (Global Positioning System) receiver module 570 can provide additional navigation- and location-related wireless data to device 550, which can be used as appropriate by applications running on device 550.

Device 550 can also communicate audibly using audio codec 560, which can receive spoken information from a user and convert it to usable digital information. Audio codec 560 can likewise generate audible sound for a user, such as through a speaker, e.g., in a handset of device 550. Such sound can include sound from voice telephone calls, can include recorded sound, e.g., voice messages, music files, etc. and can also include sound generated by applications operating on device 550.

The computing device 550 can be implemented in a number of different forms, as shown in the figure. For example, it can be implemented as a cellular telephone 580. It can also be implemented as part of a smartphone 582, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more electronic devices, the method comprising:
   obtaining data representing a video viewable to a user through a head-mounted device in an immersive virtual reality environment and that identifies spatial positions assigned to one or more objects within the video, and obtaining audio data associated with the video that (i) encodes one or more audio streams corresponding to each of the one or more objects and (ii) identifies, for each of the one or more audio streams, a frame of the video representing a start point of an audio stream;

receiving, from a computing device of a user, an indication of playback of a particular frame representing a start point of a particular audio stream from among the one or more audio streams;

providing, for display in a field-of-view of the video that is viewable to the user on the computing device, a visual notification representing metadata associated with a particular object corresponding to the particular audio stream, the visual notification being displayed in a particular spatial position within the field-of-view;

receiving, from the computing device of the user, user input data associated with playback of the video;

determining a gaze point of the user based on the received user input data;

evaluating the gaze point of the user with respect to the particular spatial position within the field-of-view; and based on evaluating the gaze point with respect to the particular spatial position within the field-of-view, selectively adjusting audio data provided to the computing device of the user.

2. The method of claim 1 wherein the gaze point of the user is determined based at least on head movement of the user.

3. The method of claim 1, wherein the gaze point of the user is determined based at least on eye movement of the user.

4. The method of claim 1, further comprising displaying, within the field-of-view, a user interface element for each of the one or more objects, the locations of the user interface elements for the one or more objects in the field-of-view corresponding to the spatial positions assigned to the one or more objects.

5. The method of claim 4, wherein:
the spatial locations assigned to least one of the objects is adjusted during playback of the video; and
the locations of the user interface elements for the at least one or the objects is adjusted according to the adjustment of the spatial locations assigned to the at least one of the objects.

6. The method of claim 5, wherein:
the at least one of the objects is moved along a trajectory within the field-of-view; and
the adjustment to the locations of the user interface elements for the at least one of the objects follows the movement trajectory for the at least one of the objects.

7. The method of claim 4, further comprising:
evaluating the gaze point of the user with respect to the spatial positions assigned to the one or more objects; and
determining, based on evaluating the gaze point of the user with respect to the spatial positions assigned to the one or more objects, that the gaze point of the user is directed to a portion of the field-of-view of the video that includes the user interface element for a particular target object.

8. The method of claim 1, wherein selectively adjusting audio data provided to the computing device of the user comprises:
transmitting, for output to the computing device of the user, the particular audio stream corresponding to the particular object while restricting transmission of the other audio streams included in the one or more audio streams that are not the particular audio stream.

9. The method of claim 1, wherein selectively adjusting the output of the audio provided to the user comprises:
determining, for the particular object, a scaling factor based on a distance between the gaze point and the spatial position in the field-of-view that is associated with the visual notification;
adjusting a magnitude of volume of the particular audio stream based on the scaling factor; and
transmitting, for output to the computing device of the user, the particular audio stream having the adjusted magnitude of volume.

10. A system comprising:
one or more computers; and
one or more storage devices storing instructions that, when executed by the one or more computers, cause the one or more computers to perform operations comprising:
obtaining data representing a video viewable to a user through a head-mounted device in an immersive virtual reality environment and that identifies spatial positions assigned to one or more objects within the video, and
obtaining audio data associated with the video that (i) encodes one or more audio streams corresponding to each of the one or more objects and (ii) identifies, for each of the one or more audio streams, a frame of the video representing a start point of an audio stream;
receiving, from a computing device of a user, an indication of playback of a particular frame representing a start point of a particular audio stream from among the one or more audio streams;
providing, for display in a field-of-view of the video that is viewable to the user on the computing device, a visual notification representing metadata associated with a particular object corresponding to the particular audio stream, the visual notification being displayed in a particular spatial position within the field-of-view;
receiving, from the computing device of the user, user input data associated with playback of the video;
determining a gaze point of the user based on the received user input data;
evaluating the gaze point of the user with respect to the particular spatial position within the field-of-view; and
based on evaluating the gaze point with respect to the particular spatial position within the field-of-view, selectively adjusting audio data provided to the computing device of the user.

11. The system of claim 10 wherein the gaze point of the user is determined based at least on head movement of the user.

12. The system of claim 10, wherein the gaze point of the user is determined based at least on eye movement of the user.

13. The system of claim 10, wherein the operations further comprise displaying, within the field-of-view, a user interface element for each of the one or more objects, the locations of the user interface elements for the one or more objects in the field-of-view corresponding to the spatial positions assigned to the one or more objects.

14. The system of claim 13, wherein:
the spatial locations assigned to least one of the objects is adjusted during playback of the video; and the locations of the user interface elements for the at least one or the objects is adjusted according to the adjustment of the spatial locations assigned to the at least one of the objects.

15. A non-transitory computer-readable storage device encoded with computer program instructions that, when executed by one or more computers, cause the one or more computers to perform operations comprising:

obtaining data representing a video viewable to a user through a head-mounted device in an immersive virtual reality environment and that identifies spatial positions assigned to one or more objects within the video, and obtaining audio data associated with the video that (i) encodes one or more audio streams corresponding to each of the one or more objects and (ii) identifies, for each of the one or more audio streams, a frame of the video representing a start point of an audio stream;

receiving, from a computing device of a user, an indication of playback of a particular frame representing a start point of a particular audio stream from among the one or more audio streams;

providing, for display in a field-of-view of the video that is viewable to the user on the computing device, a visual notification representing metadata associated with a particular object corresponding to the particular audio stream, the visual notification being displayed in a particular spatial position within the field-of-view;

receiving, from the computing device of the user, user input data associated with playback of the video;

determining a gaze point of the user based on the received user input data;

evaluating the gaze point of the user with respect to the particular spatial position within the field-of-view; and based on evaluating the gaze point with respect to the particular spatial position within the field-of-view, selectively adjusting audio data provided to the computing device of the user.

16. The non-transitory computer-readable medium of claim 15 wherein the gaze point of the user is determined based at least on head movement of the user.

17. The non-transitory computer-readable medium of claim 15, wherein the gaze point of the user is determined based at least on eye movement of the user.

18. The non-transitory computer-readable medium of claim 15, wherein the operations further comprise displaying, within the field-of-view, a user interface element for each of the one or more objects, the locations of the user interface elements for the one or more objects in the field-of-view corresponding to the spatial positions assigned to the one or more objects.

19. The non-transitory computer-readable medium of claim 18, wherein:

the spatial locations assigned to least one of the objects is adjusted during playback of the video; and the locations of the user interface elements for the at least one or the objects is adjusted according to the adjustment of the spatial locations assigned to the at least one of the objects.

* * * * *